United States Patent
Masaki

(10) Patent No.: US 6,935,392 B2
(45) Date of Patent: Aug. 30, 2005

(54) PNEUMATIC TIRE INCLUDING SLANT MAIN GROOVES AND SIPES

(75) Inventor: Takeo Masaki, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 238 days.

(21) Appl. No.: 10/317,132

(22) Filed: Dec. 12, 2002

(65) Prior Publication Data

US 2003/0111151 A1 Jun. 19, 2003

(30) Foreign Application Priority Data

Dec. 13, 2001 (JP) .......................................... 2001-380289

(51) Int. Cl.$^7$ .......................... B60C 11/11; B60C 12/12; B60C 115/00
(52) U.S. Cl. .............................. 152/209.18; 152/209.28; 152/DIG. 3
(58) Field of Search ..................... 152/209.18, 209.26, 152/DIG. 3; D12/559, 563–567

(56) References Cited

U.S. PATENT DOCUMENTS

| | | | |
|---|---|---|---|
| 5,370,168 A | * | 12/1994 | Boiocchi et al. ........ 152/209.28 |
| 5,375,639 A | * | 12/1994 | Suzuki et al. .......... 152/209.28 |
| D388,753 S | * | 1/1998 | Brayer et al. ............... D12/565 |
| 5,785,780 A | * | 7/1998 | Ochi ...................... 152/DIG. 3 |
| 6,450,223 B1 | * | 9/2002 | Landers et al. ......... 152/209.28 |
| 6,691,753 B2 | * | 2/2004 | Hanebuth et al. ....... 152/209.28 |

FOREIGN PATENT DOCUMENTS

| JP | 09-156320 | 6/1997 |
|---|---|---|
| JP | 10-236111 | 9/1998 |

* cited by examiner

Primary Examiner—Steven D. Maki
(74) Attorney, Agent, or Firm—Rader, Fishman & Grauer PLLC

(57) ABSTRACT

A pneumatic tire according to the present invention includes a tread surface having a tire rotation direction designated in one direction. The tread surface has a straight main groove extending in a circumferential direction of the tire in the center, and lateral grooves obliquely extending in a width direction of the tire on both sides thereof, defining blocks thereon. On both sides of the straight main groove, left and right slant main grooves are arranged to cross three or more lateral grooves. Both ends of the slant main grooves are positioned within the blocks, and the groove width thereof is gradually enlarged from both end portions toward the center portion of the slant main groove. The inclination angle of the slant main grooves relative to the tire circumferential direction is set in a range of 10 to 45°, and the maximum groove width thereof is set to 80 to 110% of the groove width of the straight main groove.

6 Claims, 2 Drawing Sheets

PNEUMATIC TIRE INCLUDING SLANT MAIN GROOVES AND SIPES

BACKGROUND OF THE INVENTION

The present invention relates to a pneumatic tire and, more specifically, to a pneumatic tire capable of compatibly achieving both drainage performance and uneven wear resistance.

In general, it has been known that a straight groove extending on the tread surface of a pneumatic tire in a circumferential direction of the tire can provide a drainage effect during straight running, and a slant groove extending obliquely relative to the tire circumferential direction thereon can provide high drainage during turning. Thus, conventionally, in order to secure high drainage performance during both straight running and turning, a tread pattern combining the straight groove or grooves with the slant grooves has been proposed.

An example is illustrated in FIG. 2. Three straight main grooves 12 are disposed on a tread surface 11 extending in a tire circumferential direction T and drainage is secured during straight running by these three straight main grooves 12. A tire inner portion of each lateral groove 13 obliquely extending in a tire width direction is formed as a slant groove section 13a and drainage is enhanced during turning by the slant groove sections 13a.

However, when the slant groove sections 13a are disposed as described above, a contact pressure distribution of each block 14 defined by the straight main grooves 12 and the lateral grooves 13 results in non-uniform, causing a reduction in uneven wear resistance. Thus, in terms of the pneumatic tire having a block pattern defined by straight grooves and slant grooves, there has been a difficulty in achieving both drainage performance and uneven wear resistance.

SUMMARY OF THE INVENTION

An object of the present invention is to provide a pneumatic tire having a block pattern defined by a straight groove and slant grooves, which can compatibly achieve both drainage performance and uneven wear resistance.

In order to achieve the above object, the present invention provides a pneumatic tire which includes a tread surface having a rotation direction of the tire designated in one direction; a straight main groove extending straight in a circumferential direction of the tire on a center of the tread surface; lateral grooves extending in a width direction of the tire from the straight main groove to both sides thereof and inclining toward a reverse rotation direction of the tire, the lateral grooves being arranged at predetermined pitch along the tire circumferential direction; blocks defined by the straight main groove and the lateral grooves; and left and right slant main grooves arranged at predetermined pitch along the tire circumferential direction on both sides of the straight main groove to cross three or more lateral grooves, the slant main grooves being inclined relative to the tire circumferential direction so that tire reverse rotation direction sides thereof are separated away from the straight main groove greater than tire rotation direction sides thereof. Both ends of the slant main grooves are positioned within the blocks; a groove width of each slant main groove is gradually widened from both end portions thereof toward a center portion thereof, an inclination angle of the slant main grooves relative to the tire circumferential direction is set in a range of 10 to 45°; and a maximum groove width thereof is set to be 80 to 110% of a groove width of the straight main groove.

Thus, the slant main grooves are disposed to cross three or more lateral grooves, both ends of the slant main grooves are positioned within the blocks, and the groove width of the center portion of each slant main groove is varied to be wider as described above. Therefore, a contact pressure distribution of the blocks defined by the straight main groove, the lateral grooves, and the slant main grooves can be made more uniform, whereby uneven wear resistance can be improved.

By specifying the inclination angle of the slant main grooves to the above-described range, a high drainage effect can be exhibited during turning, and on the other hand, high drainage performance can be secured during straight running in cooperation with the straight main groove arranged in the center of the tread surface. Therefore, drainage performance and uneven wear resistance can both be compatibly achieved.

DETAILED DESCRIPTION OF PREFERRED EMBODIMENT

Figure 1:
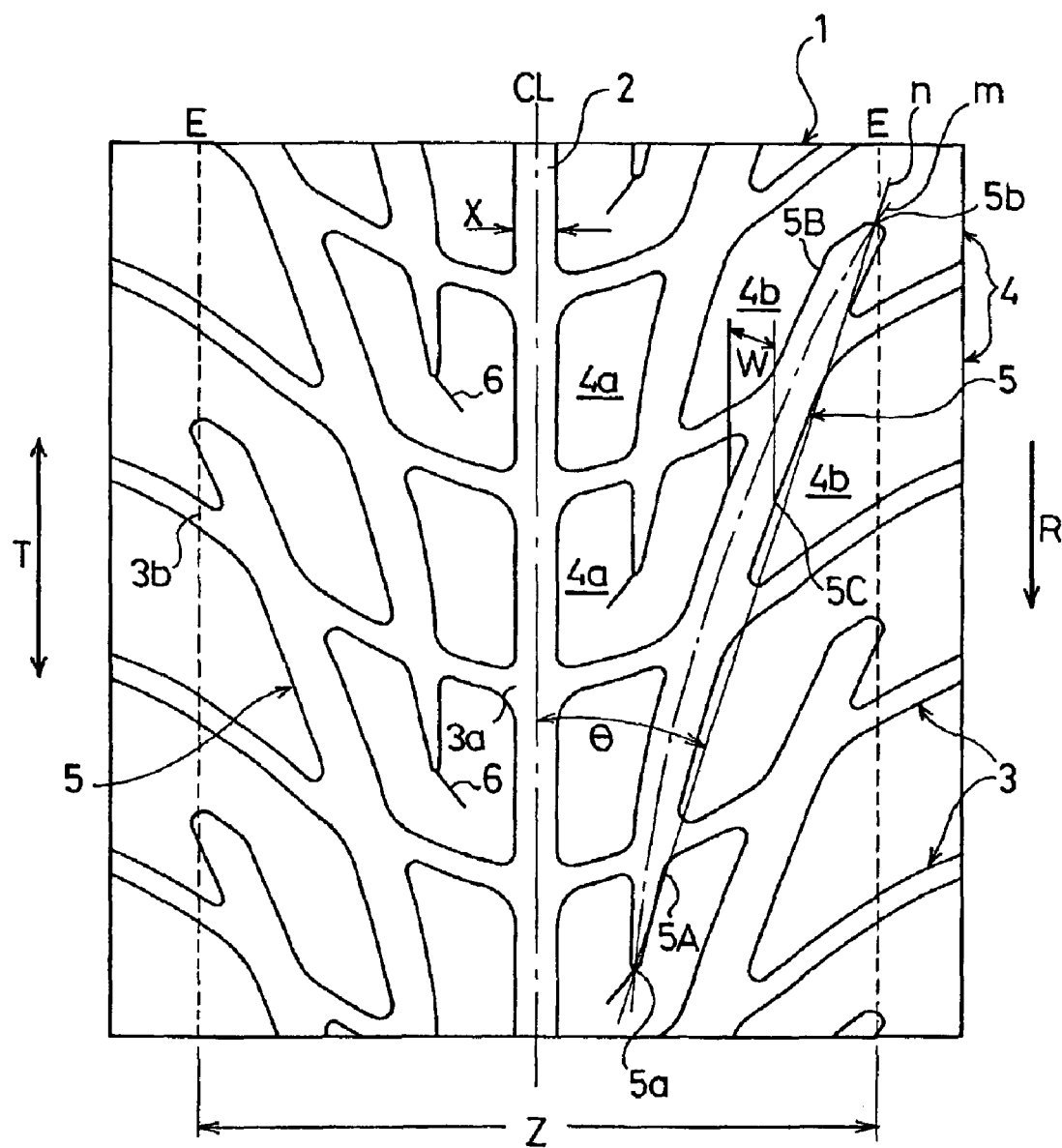
FIG. 1 is a developed view showing a main portion of the tread surface of a pneumatic tire according to the present invention.

Referring to FIG. 1, a pneumatic tire according to the present invention includes a tread surface 1 having a tire rotational direction designated as indicated by an arrow R. On the tread surface 1, there is provided one straight main groove 2 extending straight in a circumferential direction T of the tire on a tire center line CL. Lateral grooves 3 extending from the straight main groove 2 in a width direction of the tire towards both sides thereof are arranged at a predetermined pitch along the tire circumferential direction T. Each of the lateral grooves 3 is curved in shape and inclines toward the tire reverse rotation direction. Blocks 4 are defined by the straight main groove 2 and the lateral grooves 3.

On both sides of the straight main groove 2, left and right slant main grooves 5 inclining relative to the tire circumferential direction T are disposed at a predetermined pitch along the tire circumferential direction T. The slant main grooves 5 each have one tire reverse rotation direction side which is separated away from the straight main groove 2 greater than a tire rotational direction side thereof, are convex toward the tire reverse rotation direction, and extend to a contact end E in such a manner that it inclines in a curved shape so as to gradually increase an inclination angle thereof relative to the tire circumferential direction T. The slant main grooves 5 each cross three lateral grooves 3, and each block 4 is formed into an inner block 4a and an outer block 4b.

A tire rotational direction side end 5a of each of the slant main grooves 5 is positioned in a center area of the inner block 4a, while a tire reverse rotation direction side end 5b thereof is located in a center area of the outer block 4b, both ends 5a and 5b being positioned within the blocks 4. The left and right slant main grooves 5 are asymmetrically arranged by being shifted by one pitch of the lateral grooves 3. A groove width of each slant main groove 5 is gradually widened from both end portions 5A and 5B toward a center portion 5C.

An inclination angle θ of each slant main groove 5 relative to the tire circumferential direction T is set in a range of 10 to 45°. The inclination angle θ of the slant main groove 5 inclined to be curved, as described above, is an inclination angle of a straight line n connecting both ends 5a and 5b (both ends positioned on the center line m of the slant main groove 5). A maximum groove width W of each slant main groove 5 where the center portion 5C becomes widest is 80 to 110% of a groove width X of the straight main groove 2.

One sipe 6 is formed extending from the tire rotation direction side end 5a of each slant main groove 5 within the inner block 4a in which the end portion 5A is positioned. Each sipe 6 extends straight from the tire rotational direction side end 5a toward the straight main groove 2 and inclines toward the tire rotation direction, and its end is positioned within the inner block 4a without communicating with the straight main groove 2.

According to the above-described pneumatic tire of the present invention, the slant main grooves 5 are arranged to cross three lateral grooves 3, while both ends 5a and 5b thereof are positioned within the blocks 6, and the groove width of the center portion 5C is varied to be wider as describe above, whereby a contact pressure distribution of the blocks 4 defined on the tread surface 1 can be more uniform. Thus, an improved uneven wear resistance can be obtained.

On the other hand, by specifying the inclination angle θ of the slant main grooves 5 to the above-described range, a high drainage can be secured and, by the combination with the straight main groove 2 arranged in the center of the tread surface 1, a high drainage can be secured during straight running. Therefore, in the pneumatic tire having a block pattern defined by the straight main groove 2 and the slant main grooves 5, drainage performance and uneven wear resistance can be compatibly achieved.

If the ends 5a and 5b of the slant main grooves 5 are not positioned within the blocks 4, and if the slant main grooves communicate with the lateral grooves 3, drainage performance and uneven wear resistance are adversely affected. If the slant main grooves 5 are not structured to be gradually widened from both end portions 5A and 5B toward the center portion 5C, uneven wear resistance is lowered. If the number of lateral grooves 3 crossed by each of the slant main grooves 5 is two or less, a reduction occurs in uneven wear resistance.

If the inclination angle θ of the slant main grooves 5 is lower than 10°, drainage performance is lowered during turning. If the inclination angle θ exceeds 45°, drainage performance is damaged during straight running. If the maximum groove width W of the slant main grooves 5 is smaller than 80% of the groove width X of the straight main groove 2, drainage performance is deteriorated during straight running. The maximum groove width W which is larger than 110% adversely affects the contact pressure distribution of the blocks 4a and 4b.

According to the present invention, the slant main grooves 5 may have a straight line shape in place of the above-described curved line shape.

The slant main grooves 5 each are arranged to cross three lateral grooves 3 in the foregoing embodiment, but can be arranged to cross three or more lateral grooves 3. The maximum number of the lateral grooves 3 to be crossed by each slant main groove 5 may be eight from the standpoint of block stiffness, though the number varies depending on tire sizes.

The groove width X of the straight main groove 2 may be set to 3 to 10% of the contact width Z of the tread surface 1. The contact width Z referred here and the foregoing contact end E are the maximum contact width and its contact end measured under the condition of 75% of the standardized load (load ability) ruled by JATMA (JATMA YEAR BOOK 2001) with the tire being fixed to a JATMA standard rim and with its air pressure having a JATMA ruled pressure.

An inclination angle of the lateral grooves 3 can be set in a range of 5 to 35° relative to the tire width direction. In the case of the above-describe curved line, the inclination angle is an angle of the straight line connecting the inner end 3a of the lateral groove 3 with the position 3b on the contact end E in the center of the width direction of the lateral groove 3.

The present invention can preferably be used especially for racing tires which require high drainage performance both during straight running and during turning when running in the rain. Needless to say, the present invention can be suitably applied to pneumatic tires used for other vehicles.

EXAMPLE

Figure 2:
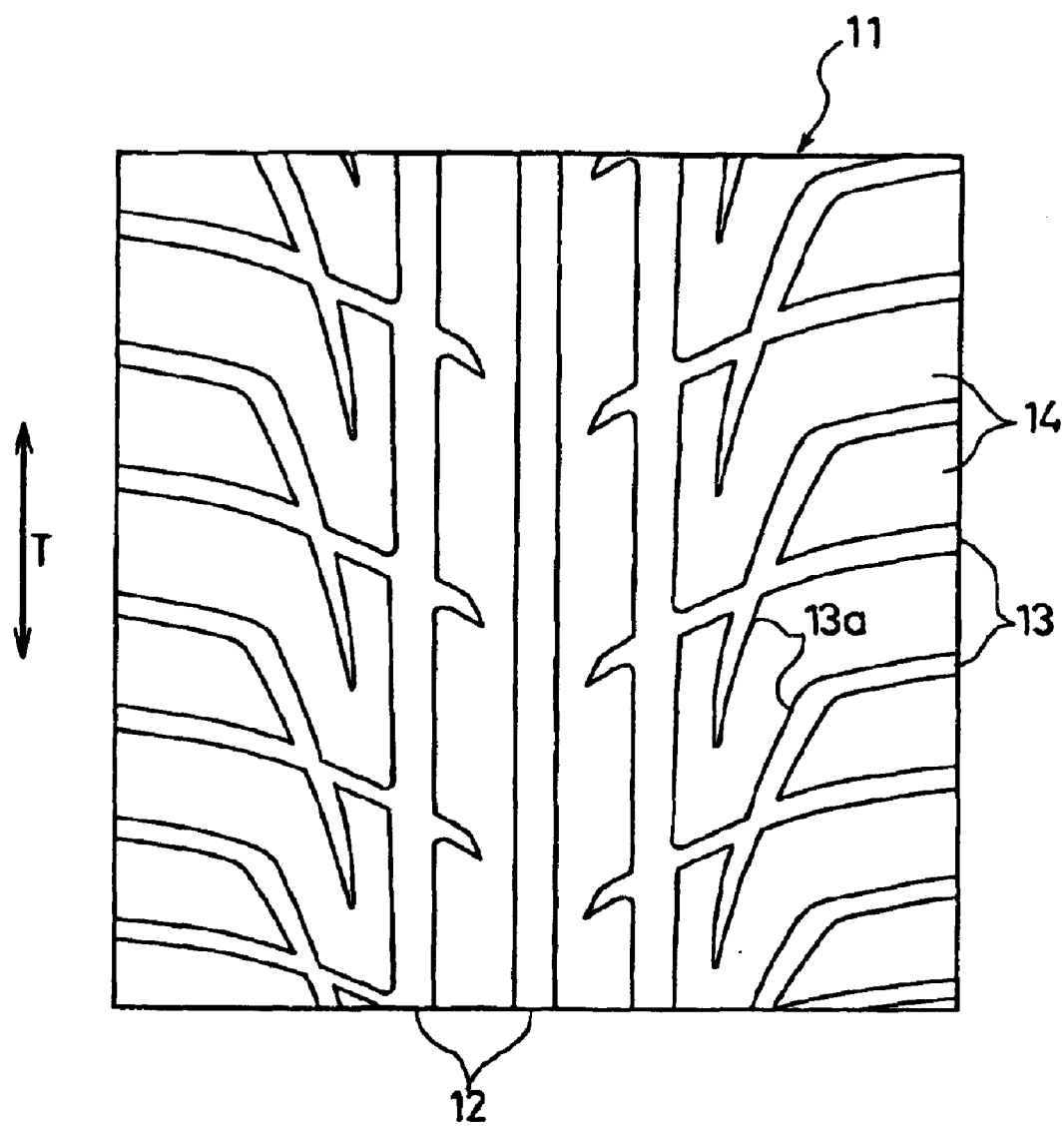
FIG. 2 is a developed view showing a main portion of the tread surface of a conventional tire.

Tires 1 to 7 concerning to the present invention, comparative tires 1 to 7, and conventional tires were prepared with the same tire size of 215/45R17, the present invention tires 1 to 6 and the comparative tires 1 to 4, with the structure of FIG. 1, having the inclination angles and maximum groove widths of the slant main grooves shown in Table 1, the present invention tire 7 having the same structure as the present invention tire 2 except that the slant main grooves were formed in straight, the comparative tire 5 having the same structure as the present invention tire 2 except that each of the slant main grooves was arranged to cross two lateral grooves, the comparative tire 6 having the same structure as the present invention tire 2 except that the slant main grooves were communicatingly connected at both ends thereof to the lateral grooves, the comparative tire 7 having the same structure as the present invention tire 2 except that the slant main grooves had a constant groove width, and the conventional tire having the structure shown in FIG. 2.

The groove width of the straight main grooves of the present invention tires 1 to 7 and comparative tires 1 to 7 were respectively set to 7% of the contact width, and the inclination angle of the lateral grooves thereof were respectively set to 25°. The conventional tire had a groove area approximately equal to that of the present invention tire 2.

These test tires were each fixed to a 17×7J size rim with the air pressure being set to 2.0 kPa and mounted to a vehicle with a 2000 cc displacement, and by the following measurement methods, tests were conducted to evaluate straight running drainage performance, turning drainage performance, and uneven wear resistance. The results shown in Table 1 were obtained.

Straight Running Drianage Performance

A limit speed at which a hydroplaning phenomenon occurred was measured when running straight on a wet flat road of an average water depth of 10 mm at an increasing speed, and the result was evaluated based on the index value of the conventional tire as 100. The larger the index number, the better straight running drainage performance is.

Turning Drainage Performance

A limit speed at which a hydroplaning phenomenon occurred was measured when running, drawing a circular arc of a 100 m radius, on a wet flat road of an average water depth of 10 mm at an increasing speed, and the result was evaluated based on the index value of the conventional tire as 100. The larger the index number, the better turning drainage performance is.

Uneven Wear Resistance

After running for 8000 km on a dry test road constituted of a paved road surface at an average speed of 80 km/h, a maximum amount and minimum amount of wear generated on each block surface were measured and, based on the wear amount difference, uneven wear resistance was evaluated. The result was shown based on the index value of the conventional tire as 100. The larger the index value, the better uneven wear resistance is.

TABLE 1

| | Inclination angle (°) | Maximum groove width (%) | Straight running drainage performance | Turning drainage performance | Uneven wear resistance |
|---|---|---|---|---|---|
| Comparative tire 1 | 5 | 100 | 112 | 98 | 102 |
| Present invention tire 1 | 10 | 100 | 110 | 105 | 104 |
| Present invention tire 2 | 30 | 100 | 108 | 108 | 104 |
| Present invention tire 3 | 45 | 100 | 105 | 110 | 104 |
| Comparative tire 2 | 50 | 100 | 98 | 112 | 102 |
| Comparative tire 3 | 30 | 70 | 95 | 100 | 105 |
| Present invention tire 4 | 30 | 80 | 102 | 103 | 107 |
| Present invention tire 5 | 30 | 90 | 105 | 105 | 105 |
| Present invention tire 6 | 30 | 110 | 108 | 107 | 103 |
| Comparative tire 4 | 30 | 120 | 110 | 109 | 98 |
| Present invention tire 7 | 30 | 100 | 107 | 108 | 104 |
| Comparative tire 5 | 30 | 100 | 104 | 104 | 98 |
| Comparative tire 6 | 30 | 100 | 99 | 99 | 97 |
| Comparative tire 7 | 30 | 100 | 108 | 108 | 96 |
| Conventional tire | — | — | 100 | 100 | 100 |

As shown in Table 1, it can be understood that the tires related to the present invention can provide higher drainage performance and uneven wear resistance than the drainage-improved conventional tire, and drainage performance and uneven wear resistance can be compatibly achieved.

As described above, according to the present invention, by specifying the straight main groove and the slant main grooves in the foregoing manner, uneven wear resistance can be improved due to the more even contact pressure distribution of the blocks, and high drainage effects during turning and straight running can be secured. Accordingly, drainage performance and uneven wear resistance can be compatibly achieved.

What is claimed is:

1. A pneumatic tire comprising:

a tread surface having a rotation direction of the tire designated in one direction;

a straight main groove extending straight in a circumferential direction of the tire on a center of the tread surface;

lateral grooves extending in a width direction of the tire from the straight main groove to both sides thereof and inclining toward a reverse rotation direction of the tire, the lateral grooves being arranged at predetermined pitch along the tire circumferential direction;

blocks defined by said straight main groove and said lateral grooves; and left and right slant main grooves arranged at predetermined pitch long the tire circumferential direction on both sides of the straight main groove to cross three or more lateral grooves, the slant main grooves being inclined relative to the tire circumferential direction so that tire reverse rotation direction sides thereof are separated away from the straight main groove greater than tire rotation direction sides thereof, and one sipe extending from the tire rotation direction side end of each of said slant main grooves within a block in which the tire rotation direction side end is positioned, wherein both ends of the slant main grooves are positioned within the blocks, a groove width of each slant main groove is gradually widened from both end portions thereof toward a center portion thereof, an inclination angle of said slant main grooves relative to the tire circumferential direction is set in a range of 10 to 45°, and a maximum groove width thereof is set to be 80 to 110% of a groove width of said straight main groove.

2. A pneumatic tire according to claim 1, wherein said slant main grooves are formed in straight, or curved so as to be convex toward the tire reverse rotation direction.

3. A pneumatic tire according to claim 1, wherein the groove width of said straight main groove is set to be 3 to 10% of a contact width of the tread surface.

4. A pneumatic tire according to claim 1, wherein the left and right slant main grooves each cross 3 to 8 lateral grooves.

5. A pneumatic tire according to claim 1, wherein said blocks each have an inner block and an outer block defined by said slant main grooves, the tire rotation direction side end of each of said slant main grooves is positioned in a center area of the inner block, and the tire reverse rotation direction side end thereof is positioned in a center area of the outer block.

6. A pneumatic tire according to claim 1, wherein an inclination angle of said lateral grooves relative to the tire width direction is set in a range of 5 to 35°.

* * * * *